US012662350B2

(12) United States Patent
Daniels et al.

(10) Patent No.: US 12,662,350 B2
(45) Date of Patent: Jun. 23, 2026

(54) VOICE ACTIVATED ELEVATOR PASSENGER INTERFACE CONFIGURATION DEVICE

(71) Applicant: OTIS ELEVATOR COMPANY, Farmington, CT (US)

(72) Inventors: Harrison Daniels, Avon, CT (US); Stephen Richard Nichols, Plantsville, CT (US); Marija Trcka, West Hartford, CT (US)

(73) Assignee: OTIS ELEVATOR COMPANY, Farmington, CT (US)

(*) Notice: Subject to any disclaimer, the term of this patent is extended or adjusted under 35 U.S.C. 154(b) by 1557 days.

(21) Appl. No.: 17/112,910

(22) Filed: Dec. 4, 2020

(65) Prior Publication Data

US 2022/0177266 A1 Jun. 9, 2022

(51) Int. Cl.
*B66B 1/46* (2006.01)
*B66B 1/34* (2006.01)
*B66B 3/00* (2006.01)

(52) U.S. Cl.
CPC ............ *B66B 1/468* (2013.01); *B66B 1/3461* (2013.01); *B66B 3/002* (2013.01); *B66B 2201/4646* (2013.01)

(58) Field of Classification Search
CPC .................. B88B 1/468; B88B 1/3407; B66B 2201/4606; B66B 2201/4676
See application file for complete search history.

(56) References Cited

U.S. PATENT DOCUMENTS 5,255,341 A * 10/1993 Nakajima ............... B66B 1/468 704/200
5,445,245 A * 8/1995 Ketoviita .............. B66B 5/0006 187/247
6,223,160 B1 * 4/2001 Kostka .................... B66B 1/468 704/275
7,841,452 B2 * 11/2010 Sansevero ................. B66B 1/46 187/382
7,970,437 B2 * 6/2011 Mansikkaniemi ...... H04L 67/04 455/566
8,151,942 B2 * 4/2012 Rusanen ................. B66B 1/468 187/247
8,719,037 B2 * 5/2014 Gazdzinski ............... G06F 3/14 705/14.43
9,384,733 B2 * 7/2016 Takeuchi ................ B66B 1/468
9,858,039 B2 * 1/2018 Kumar .................... G06F 3/167
9,957,132 B2 * 5/2018 Berryhill ................. B66B 1/468
(Continued)

*Primary Examiner* — Rina I Duda
(74) *Attorney, Agent, or Firm* — Carlson, Gaskey & Olds, P.C.

(57) ABSTRACT

An illustrative example embodiment of an elevator passenger interface configuration device includes a configuration input that allows an authorized individual to input an indication of a desired functionality of at least one selected elevator passenger interface that is configured to receive audible passenger input. A processor determines at least one operation executable by the elevator passenger interface to provide the desired functionality based on the indication of the desired functionality. Memory associated with the processor at least temporarily stores information regarding the operation. A configuration output is configured to communicate information regarding the operation from the memory to the elevator passenger interface.

30 Claims, 2 Drawing Sheets

(56) References Cited

U.S. PATENT DOCUMENTS

| | | | | |
|---|---|---|---|---|
| 10,000,362 | B2 * | 6/2018 | Nagata | B66B 13/143 |
| 2002/0036122 | A1 * | 3/2002 | Fayette | B66B 3/008 187/247 |
| 2013/0073387 | A1 * | 3/2013 | Heath | G06Q 30/02 705/14.53 |
| 2013/0220740 | A1 * | 8/2013 | Yoo | B66B 1/34 187/380 |
| 2015/0212791 | A1 * | 7/2015 | Kumar | G10L 15/22 715/728 |
| 2015/0274488 | A1 * | 10/2015 | Ramakrishnan | B66B 1/3461 187/387 |

* cited by examiner

VOICE ACTIVATED ELEVATOR PASSENGER INTERFACE CONFIGURATION DEVICE

BACKGROUND

Many elevator systems include hall call buttons that allow a passenger to indicate a desire to travel up or down. The system responds by sending an elevator car to the location of the passenger. Once onboard the elevator car, the passenger can select a destination floor using a car operating panel that typically includes a set of buttons corresponding to the available floors.

Over time, different technologies have allowed for different types of interfaces for elevator passengers to interact with the elevator system to request service. For example, destination entry systems have been developed that include an interface, such as a kiosk, where a passenger can enter a desired destination before boarding an elevator car. The elevator system responds to such a request by assigning a car to carry the passenger to the intended destination and notifies the passenger which car to board. The passenger need not, and typically cannot, enter a destination from inside the elevator car in such systems.

Different types of passenger interfaces, whether inside or outside an elevator car, may have unique requirements during installation and may offer unique opportunities for customization. In some instances, a specialized tool may be needed to set up the interface.

SUMMARY

An illustrative example embodiment of an elevator passenger interface configuration device includes a configuration input that allows an authorized user to input an indication of a desired functionality of at least one selected elevator passenger interface that is configured to receive audible passenger input. A processor determines at least one operation executable by the elevator passenger interface to provide the desired functionality based on the indication of the desired functionality. Memory associated with the processor at least temporarily stores information regarding the operation. A configuration output is configured to communicate the information regarding the operation from the memory to the elevator passenger interface.

In addition to one or more of the features described above, or as an alternative, the desired functionality comprises an ability to receive a passenger request spoken in at least one selected language, the desired functionality comprises an ability to provide a response in the selected language, and the response is at least one of audible or visible.

In addition to one or more of the features described above, or as an alternative, the desired functionality comprises an ability to receive a passenger request for elevator service to any of a predetermined plurality of destinations, the desired functionality comprises an ability to provide a response to a received passenger request for elevator service to a selected destination, and the response includes information regarding the selected destination.

In addition to one or more of the features described above, or as an alternative, the indication of the desired functionality comprises at least one custom operation corresponding to a characteristic of an environment that includes the at least one selected elevator passenger interface.

In addition to one or more of the features described above, or as an alternative, the configuration input allows a first type of authorized individual to input a first set of possible indications of desired functionality, the configuration input allows a second type of authorized individual to input a second set of possible indications of desired functionality, the first set of possible indications are for at least commissioning, installing or updating the at least one elevator passenger interface, and the second set of possible indications are for customizing the at least one elevator passenger interface.

In addition to one or more of the features described above, or as an alternative, the first type of authorized individual is an elevator system specialist or an elevator technician and the second type of individual is a building owner or building manager.

In addition to one or more of the features described above, or as an alternative, the second set of possible indications includes indications of at least one of a scheduled announcement, an advertisement, a building directory, and a custom voice command that a passenger can provide to the at least one selected elevator passenger interface.

In addition to one or more of the features described above, or as an alternative, the configuration output is configured to communicate with the at least one passenger interface from a location that is remote from the at least one passenger interface.

In addition to one or more of the features described above, or as an alternative, the device includes a housing and wherein the configuration input, the processor, the memory and the configuration output are all supported by the housing.

In addition to one or more of the features described above, or as an alternative, the housing is configured to be carried by an individual and the configuration output is configured to communicate with the at least one passenger interface using a short range wireless communication protocol.

In addition to one or more of the features described above, or as an alternative, the configuration output includes a hardware connection that is configured to establish a physical connection with an input port of the at least one passenger interface.

In addition to one or more of the features described above, or as an alternative, the desired functionality includes integrating at least one aspect of the at least one passenger interface with at least one other building system at a location of the at least one passenger interface.

In addition to one or more of the features described above, or as an alternative, the configuration input is voice-activated.

In addition to one or more of the features described above, or as an alternative, the processor determines the at least one operation by interpreting the indication of the desired functionality or compiling the indication of the desired functionality.

An illustrative example embodiment of a method of using a configuration device for configuring an elevator passenger interface includes receiving, at a configuration input of the device, an indication of a desired functionality of at least one selected elevator passenger interface that is configured to receive audible passenger input; determining, by a processor of the device, at least one operation executable by the at least one selected elevator passenger interface to provide the desired functionality based on the indication of the desired functionality; at least temporarily storing information regarding the at least one operation in a memory of the configuration device; and communicating the information regarding the at least one operation from the memory to the selected elevator passenger interface.

In addition to one or more of the features described above, or as an alternative, the desired functionality comprises an ability to receive a passenger request spoken in at least one selected language, the desired functionality comprises an ability to provide a response in the selected language, and the response is at least one of audible or visible.

In addition to one or more of the features described above, or as an alternative, the desired functionality comprises an ability to receive a passenger request for elevator service to any of a predetermined plurality of destinations, the desired functionality comprises an ability to provide a response to a received passenger request for elevator service to a selected destination, and the response includes information regarding the selected destination.

In addition to one or more of the features described above, or as an alternative, the indication of the desired functionality comprises at least one custom operation corresponding to a characteristic of an environment that includes the at least one selected elevator passenger interface.

In addition to one or more of the features described above, or as an alternative, the desired functionality includes integrating at least one aspect of the at least one passenger interface with at least one other building system at a location of the at least one passenger interface.

In addition to one or more of the features described above, or as an alternative, the method includes communicating with the at least one passenger interface from a location that is remote from the at least one passenger interface or using a short range wireless communication protocol.

The various features and advantages of at least one disclosed example embodiment will become apparent to those skilled in the art from the following detailed description. The drawings that accompany the detailed description can be briefly described as follows.

DETAILED DESCRIPTION

Figure 1:
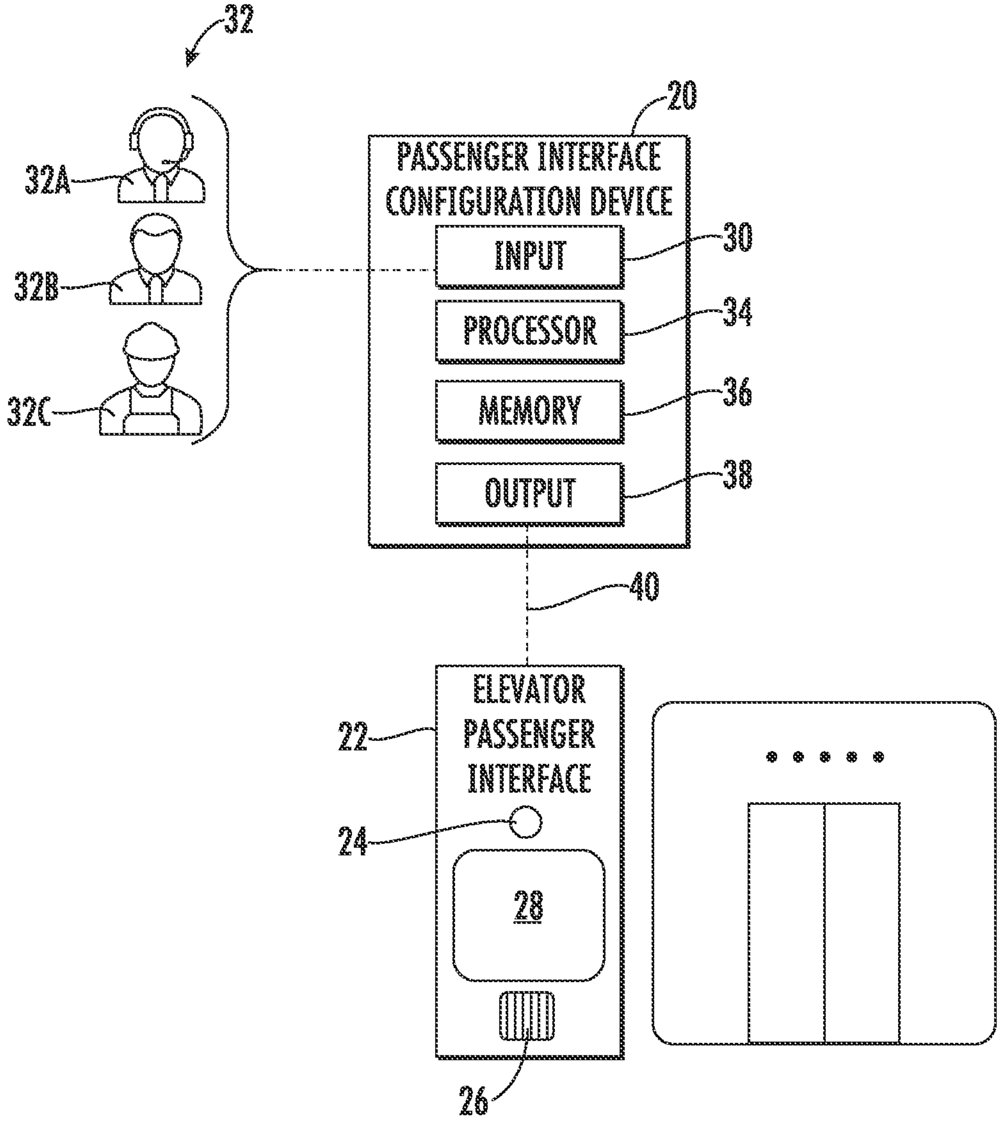
FIG. 1 schematically illustrates an example embodiment of a device for configuring an elevator passenger interface that is configured to receive audible passenger requests for elevator service.

FIG. 1 schematically illustrates a device 20 for configuring an elevator passenger interface 22 that is configured to receive audible passenger input, such as requests for elevator service. The passenger interface 22 in this example is voice-activated in that the passenger interface 22 is capable of receiving spoken passenger requests. For example, a nearby passenger can state a request for elevator service indicating a desired direction of travel or an intended destination. The example passenger interface 22 includes an input 24, such as a microphone or a sound detector, to receive audible passenger input. The passenger interface 22 includes an output 26, such as a speaker, that provides audible information to a passenger in response to the audible input. The example passenger interface 22 also includes a display 28, such as a touchscreen, that may be used to facilitate passenger input or to provide a visible output in response to passenger input, such as an indication of an elevator car assigned to a passenger request for service.

The device 20 includes a configuration input 30 that is useable by an authorized user 32 to input an indication of a desired functionality of the passenger interface 22. The configuration input 30 in some embodiments includes a microphone or sound detector that allows the individual 32 to audibly state the indication of the desired functionality. Other embodiments of the configuration input 30 include at least one of a touch screen display, a pointer device, or a keyboard that facilitates entering indications of desired functionality.

A processor 34 interprets the indication of the desired functionality and determines at least one operation executable by the elevator passenger interface 22 to provide the desired functionality. The processor 34 has computing capabilities configured, through software or firmware for example, to interpret the input from the user 32 and to generate information regarding the desired functionality. For example, the generated information includes at least one of software code, firmware or database entries. In some situations, the user 32 enters such information directly and the processor 34 compiles it.

Memory 36 associated with the processor at least temporarily stores the information regarding the operation that corresponds to the desired functionality of the passenger interface 22. A configuration output 38 is configured to communicate the information regarding the operation from the memory 36 to the elevator passenger interface 22 over a communication connection schematically shown at 40. The configuration output 38 may communicate information regarding individual operations, an entire set of operations that define all functionality of a passenger interface 22, or a subset of such operations. The communication connection 40 may be realized through a hardware, line-based, or other physical connection. In other embodiments, the communication connection 40 includes at least one wireless communication link. The communication connection 40 may be a direct connection between the configuration output 38 and the passenger interface 22 or may be through a network of other devices and connections, such as the Internet.

The configuration input 30, processor 34, memory 36 and configuration output 38 are all schematically shown together for discussion purposes. The actual components, hardware, software, or firmware used to realize them are functionally associated but not necessarily physically in the same location. For example, the configuration device 20 may be realized using physically separate components in locations remote from each other. In an example embodiment, the processor 34 and memory 36 are part of a cloud computing arrangement or another arrangement of computing machines. The processor 34 and memory 36 may both be part of a single virtual machine or each may be part of a different virtual machine. In some embodiments, all of the functional components or features of the configuration device 20 are situated within a single housing that may be portable, such as a hand-held tablet.

Example authorized users include an elevator system deployment specialist 32A, a building manager 32B that has responsibility over various features associated with an elevator system in a building, and a mechanic or technician 32C that travels to the site of an elevator system that includes the passenger interface 22.

The desired functionality of the passenger interface 22 that the device 20 facilitates configuring may include any number of selected features and capabilities or may be the entire functionality of the passenger interface 22. The device

20 is useful to configure the passenger interface 22 for the particular site where it is (or will be) installed and the associated elevator system. For example, the voice activation capability of the passenger interface 22 may be set to recognize or respond to a selected number of spoken languages that most passengers are likely to speak, depending on the location. The same language as a received request will be used for the response provided to a passenger, whether that response is audible or visual.

The user 32 can set the language or languages recognized by the passenger interface 22 by entering an indication of the language through the configuration input 30, the processor 34 generates or determines information needed to configure the passenger interface to be compatible with the indicated language. The information is then stored in the memory 36 and, at an appropriate time, communicated by the output 38 to the passenger interface 22. The user 32 can also set or design customized voice commands in the language or languages supported by the passenger interface 22.

Other functionalities or features that are configurable in the illustrated example embodiment include building floor designations or labels. For example, the passenger interface 22 can be configured to provide information to passengers regarding the floors to which the elevator system can carry a passenger from the location of the passenger interface 22 or a nearby elevator lobby if the passenger interface 22 is not in the immediate vicinity of the elevators. The passenger interface 22 can be configured through the device 20 to recognize requests for particular floors either by a floor number, level designation or another indicator of a particular floor. Possible designations that the interface 22 can recognize from a passenger include spoken requests, such as "take me to the cafeteria" or "ABC Company Reception." The ability of the passenger interface 22 to receive or handle such requests will be customized by the user 32 to suit the particular elevator system or building.

Another example functionality of the passenger interface 22 that can be configured by a user 32 of the device 20 is an ability to inform people about the layout of the building in which the passenger interface 22 is situated.

Some passenger interfaces 22 will be configured through the device 20 to be compatible or to communicate with other systems in the building. For example, the passenger interface may be set to deny access to certain floors according to a status indicator from a building security system that controls access to certain floors in the building. Other building access features may be integrated with the passenger interface.

Functionalities that are likely to be implemented by a building manager 32B include setting building directory information, custom voice commands, local advertising, and scheduled announcements. For example, a passenger requesting elevator service to the floor that includes a restaurant or cafeteria may receive a response that includes information about specials or menu items available at that time. Information provided to passengers by the passenger interface 22 may be audible, visual or a combination of audible and visual.

The elevator system specialist 32A, building manager 32B and mechanic or technician 32C each have different responsibilities. The example configuration device 20 provides different options to the different individuals. For example, the elevator system specialist 32A has access to a first set of possible passenger interface functionalities and the building manager 32B has access to a second, smaller set of functionalities. The system specialist 32A will need to configure the overall operation of passenger interfaces 22 while the building manager 32B will likely only need to adjust customization features or functionalities. The mechanic or technician 32C may have access to the same set of functionalities as the system specialist 32A or a third set of functionalities that includes less than those in the first set and more than those in the second set. In some such embodiments, user authentication provides access to the appropriate set of functionalities.

Figure 2:
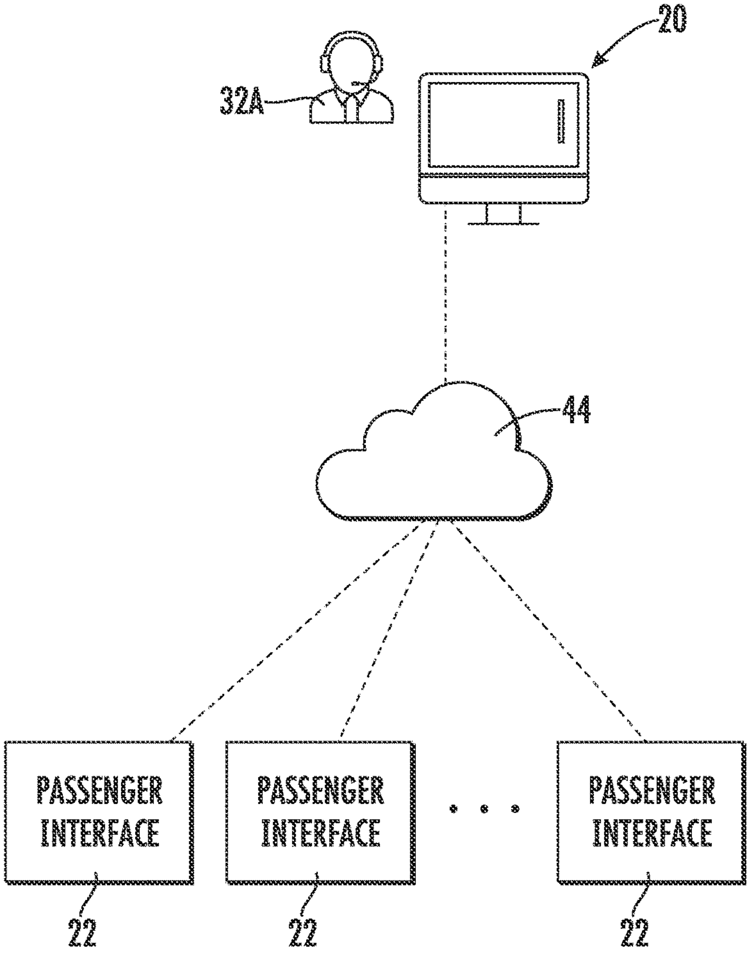
FIG. 2 schematically illustrates an example configuration of communications between multiple elevator passenger interfaces and an example device for configuring the interfaces.

FIG. 2 schematically illustrates an example scenario in which an elevator specialist 32A configures a plurality of passenger interfaces 22 from a location that is remote from the interfaces 22. Communications between the configuration device 20 and the passenger interfaces occurs over an Internet or other network connection represented at 44.

Figure 3:
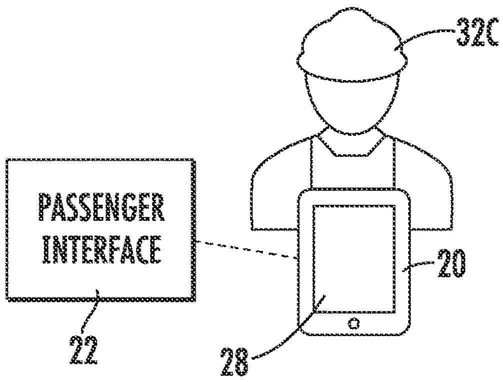
FIG. 3 schematically illustrates an example embodiment of a handheld, portable configuration device.

FIG. 3 schematically illustrates a scenario in which the device 20 is a hand-held, portable device that allows an elevator mechanic or technician 32C to configure the interface 22 while at the location of the associated elevator system. Such configuration may be part of an installation, maintenance, updating or repair procedure. Communications between the device 20 and the interface 22 occur over a line-based, physical connection or using a short-range wireless communication protocol.

Figure 4:
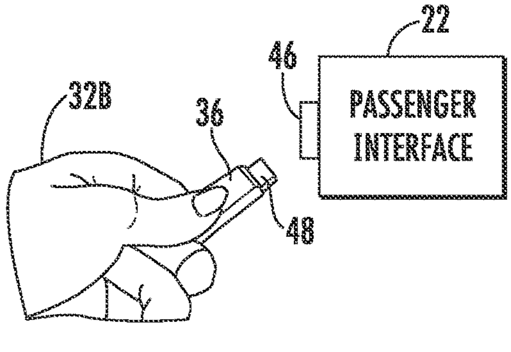
FIG. 4 schematically illustrates a technique of configuring an elevator passenger interface.

FIG. 4 illustrates a scenario in which a user, such as a building manager 32B, can configure the passenger interface 22 using a portable memory 36, such as a flash drive. The passenger interface 22 in this example embodiment includes a communication port 46 that is arranged to receive a connector 48 of the portable memory 36. The information on the memory 36 may have been installed by the building manager 32B using a separate computer or by another authorized user 32 that provided the portable memory 36 to the building manager 32B.

A variety of ways of using a configuration device 20 consistent with this description have been presented and those skilled in the art will realize that other techniques may be employed to meet the needs of their particular situation. Also, the features of one illustration or embodiment are not necessarily limited to the particular drawing or embodiment. Other combinations of the example features are possible to realize additional or different embodiments.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An elevator passenger interface configuration device, comprising:

a configuration input that allows an authorized individual to input an indication of a desired functionality of at least one selected elevator passenger interface that is configured to receive audible passenger input;

a processor that determines at least one operation executable by the at least one selected elevator passenger interface to provide the desired functionality based on the indication of the desired functionality;

a memory associated with the processor, the memory at least temporarily storing information regarding the at least one operation;

a configuration output that is configured to communicate the information regarding the at least one operation from the memory to the at least one selected elevator passenger interface;

the configuration input allows a first type of authorized individual to input a first set of possible indications of desired functionality; and the configuration input allows a second type of authorized individual, different from the first type of authorized individual, to input a second set of possible indications of desired functionality that are different from the first set of possible indications of desired functionality.

2. The elevator passenger interface configuration device of claim 1, wherein the desired functionality comprises an ability to receive a passenger request spoken in at least one selected language, the desired functionality comprises an ability to provide a response in the at least one selected language, and the response is at least one of audible or visible.

3. The elevator passenger interface configuration device of claim 1, wherein the desired functionality comprises an ability to receive a passenger request for elevator service to any of a predetermined plurality of destinations, the desired functionality comprises an ability to provide a response to a received passenger request for elevator service to a selected destination, and the response includes information regarding the selected destination.

4. The elevator passenger interface configuration device of claim 1, wherein the indication of the desired functionality comprises at least one custom operation corresponding to a characteristic of an environment that includes the at least one selected elevator passenger interface.

5. The elevator passenger interface configuration device of claim 1, wherein:

the first set of possible indications are for at least commissioning, installing or updating the at least one selected elevator passenger interface;

the second set of possible indications are for customizing the at least one selected elevator passenger interface.

6. The elevator passenger interface configuration device of claim 1, wherein the first type of authorized individual is an elevator system specialist or an elevator technician and the second type of individual is a building owner or building manager.

7. The elevator passenger interface configuration device of claim 1, wherein the second set of possible indications includes indications of at least one of a scheduled announcement, an advertisement, a building directory, and a custom voice command that a passenger can provide to the at least one selected elevator passenger interface.

8. The elevator passenger interface configuration device of claim 1, wherein the configuration output is configured to communicate with the at least one selected elevator passenger interface from a location that is remote from the at least one selected elevator passenger interface.

9. The elevator passenger interface configuration device of claim 1, comprising a housing and wherein the configuration input, the processor, the memory and the configuration output are all supported by the housing.

10. The elevator passenger interface configuration device of claim 9, wherein the housing is configured to be carried by an individual and the configuration output is configured to communicate with the at least one selected elevator passenger interface using a short range wireless communication protocol.

11. The elevator passenger interface configuration device of claim 1, wherein the configuration output includes a hardware connection that is configured to establish a physical connection with an input port of the at least one selected elevator passenger interface.

12. The elevator passenger interface configuration device of claim 1, wherein the desired functionality includes integrating at least one aspect of the at least one selected elevator passenger interface with at least one other building system at a location of the at least one selected elevator passenger interface.

13. The elevator passenger interface configuration device of claim 1, wherein the configuration input is voice-activated.

14. The elevator passenger interface configuration device of claim 1, wherein the processor determines the at least one operation by interpreting the indication of the desired functionality or compiling the indication of the desired functionality.

15. The elevator passenger interface configuration device of claim 1, wherein:

the elevator passenger interface configuration device comprises the configuration input, the processor, the memory, and the configuration output that communicates the information regarding the at least one operation to the at least one selected elevator passenger interface via a communication connection;

the at least one selected elevator passenger interface is associated with requests for elevator service and comprises a passenger input, a passenger output, and a passenger display; and any input to the configuration input is via an individual that is authorized to configure the functionality of the at least one selected elevator passenger interface.

16. The elevator passenger interface configuration device of claim 15, wherein the elevator passenger interface configuration device is separate from the at least one selected elevator passenger interface and is separate from an elevator car that responds to requests for elevator service made by a passenger to the passenger input.

17. The elevator passenger interface configuration device of claim 1, wherein the configuration input allows a third type of authorized individual, different from the first type of authorized individual and the second type of authorized individual, to input a third set of possible indications of desired functionality that are different from the first set of possible indications of desired functionality and the second set of possible indications of desired functionality.

18. The elevator passenger interface configuration device of claim 17, wherein the first type of authorized individual is an elevator system deployment specialist, the second type of individual is a building owner or building manager, and the third type of individual is a mechanic or technician.

19. The elevator passenger interface configuration device of claim 18, wherein:

the first set of possible indications of desired functionality is a first number of possible passenger interface functionalities that allows the elevator system deployment specialist to configure an overall operation of passenger interfaces;

the second set of possible indications of desired functionality is a second number of possible passenger interface functionalities that is less than the first number of possible passenger interface functionalities to allow the building owner or the building manager to adjust customization features and/or functionalities; and the third set of possible indications of desired functionality is a third number of possible passenger interface functionalities that is less than the first number of possible passenger interface functionalities and greater than the second number of possible passenger interface functionalities to allow the mechanic or the technician to configure at least one of an installation, maintenance, updating, or repair procedure.

20. A method of using a configuration device for configuring an elevator passenger interface, the method comprising:

receiving, at a configuration input of the configuration device, an indication of a desired functionality of at least one selected elevator passenger interface that is configured to receive audible passenger input;

determining, by a processor of the configuration device, at least one operation executable by the at least one selected elevator passenger interface to provide the desired functionality based on the indication of the desired functionality;

at least temporarily storing information regarding the at least one operation in a memory of the configuration device;

communicate the information regarding the at least one operation from the memory to the at least one selected elevator passenger interface;

the configuration input allowing a first type of authorized individual to input a first set of possible indications of desired functionality; and the configuration input allowing a second type of authorized individual, different from the first type of authorized individual, to input a second set of possible indications of desired functionality that are different than the first set of possible indications of desired functionality.

21. The method of claim 20, wherein the desired functionality comprises an ability to receive a passenger request spoken in at least one selected language, the desired functionality comprises an ability to provide a response in the at least one selected language, and the response is at least one of audible or visible.

22. The method of claim 20, wherein the desired functionality comprises an ability to receive a passenger request for elevator service to any of a predetermined plurality of destinations, the desired functionality comprises an ability to provide a response to a received passenger request for elevator service to a selected destination, and the response includes information regarding the selected destination.

23. The method of claim 20, wherein the indication of the desired functionality comprises at least one custom operation corresponding to a characteristic of an environment that includes the at least one selected elevator passenger interface.

24. The method of claim 20, wherein the desired functionality includes integrating at least one aspect of the at least one selected elevator passenger interface with at least one other building system at a location of the at least one selected elevator passenger interface.

25. The method of claim 20, comprising communicating with the at least one selected elevator passenger interface from a location that is remote from the at least one selected elevator passenger interface or using a short range wireless communication protocol.

26. The method of claim 20, including:

providing the configuration device to comprise the configuration input, the processor, the memory, and an output;

communicating, via the output, the information regarding the at least one operation to the at least one selected elevator passenger interface via a communication connection;

associating the at least one selected elevator passenger interface with requests for elevator service, wherein the at least one selected elevator passenger interface comprises a passenger input, a passenger output, and a passenger display; and having any input to the configuration input be via an individual that is authorized to configure functionality of the at least one selected elevator passenger interface.

27. The method of claim 26, including having the configuration device be separate from the at least one selected elevator passenger interface and be separate from an elevator car that responds to requests for elevator service made by a passenger to the passenger input.

28. The method of claim 20, including the configuration input allowing a third type of authorized individual, different from the first type of authorized individual and the second type of authorized individual, to input a third set of possible indications of desired functionality that are different from the first set of possible indications of desired functionality and the second set of possible indications of desired functionality.

29. The method of claim 28, wherein the first type of authorized individual is an elevator system deployment specialist, the second type of individual is a building owner or building manager, and the third type of individual is a mechanic or technician.

30. The method of claim 29, including:

providing the first set of possible indications of desired functionality as a first number of possible passenger interface functionalities that allows the elevator system deployment specialist to configure an overall operation of passenger interfaces;

providing the second set of possible indications of desired functionality as a second number of possible passenger interface functionalities that is less than the first number of possible passenger interface functionalities to allow the building owner or the building manager to adjust customization features and/or functionalities; and providing the third set of possible indications of desired functionality as a third number of possible passenger interface functionalities that is less than the first number of possible passenger interface functionalities and more than the second number of possible passenger interface functionalities to allow the mechanic or the technician to configure at least one of an installation, maintenance, updating, or repair procedure.

* * * * *